United States Patent [19]

Yamada

[11] Patent Number: 5,956,946
[45] Date of Patent: Sep. 28, 1999

[54] VEHICLE EXHAUST-GAS PURIFIER

[75] Inventor: Toyoo Yamada, Tokyo, Japan

[73] Assignee: Yamada Corporation, Tokyo, Japan

[21] Appl. No.: 09/044,469

[22] Filed: Mar. 19, 1998

[30] Foreign Application Priority Data

Apr. 18, 1997 [JP] Japan .................................. 9-101623

[51] Int. Cl.⁶ ............................. F01N 3/00; B01D 41/00; B03C 3/74
[52] U.S. Cl. .................................. 60/296; 55/302; 95/74; 95/279; 96/50; 60/297; 60/299
[58] Field of Search ............................. 60/295, 296, 288, 60/297, 311, 299; 55/302, DIG. 30; 95/74, 69, 70, 279, 280; 96/55, 50

[56] References Cited

U.S. PATENT DOCUMENTS

| | | | |
|---|---|---|---|
| 3,417,549 | 12/1968 | Leosis | 55/DIG. 30 X |
| 3,841,145 | 10/1974 | Boubel | 55/DIG. 30 X |
| 4,331,459 | 5/1982 | Copley | 55/302 |
| 4,494,375 | 1/1985 | Rao et al. | 60/296 |
| 4,823,549 | 4/1989 | Moser | 60/311 X |
| 4,833,883 | 5/1989 | Oda et al. | 60/311 |
| 4,875,335 | 10/1989 | Arai et al. | 60/311 X |
| 4,905,470 | 3/1990 | Reichle et al. | 60/311 X |
| 5,012,641 | 5/1991 | Travalee | 60/297 |
| 5,144,797 | 9/1992 | Swars | 60/311 X |
| 5,158,580 | 10/1992 | Chang | 55/6 |
| 5,396,764 | 3/1995 | Rao et al. | 60/311 X |
| 5,725,618 | 3/1998 | Shimoda et al. | 60/311 X |

OTHER PUBLICATIONS

Abstract; Japanese Patent Publication (Kokai) No. 8-100633, Apr. 16, 1996.
Abstract; Japanese Patent Publication (Kokai) No. 3-221127, Sep. 30, 1991.
Abstract; Japanese Patent Publication (Kokai) No. 7-088363, Apr. 4, 1995.
Abstract; Japanese Patent Publication (Kokai) No. 7-204468, Aug. 8, 1995.
Abstract; Japanese Patent Publication (Kokai) No. 7-305622, Nov. 21, 1995.
Abstract; Japanese Patent Publication (Kokai) No. 8-038911, Feb. 13, 1996.
Abstract; Japanese Patent Publication (Kokai) No. 8-128316, May 21, 1996.
Abstract; Japanese Patent Publication (Kokai) No. 9-085049, Mar. 31, 1997.

*Primary Examiner*—John E. Ryznic
*Attorney, Agent, or Firm*—Biebel & French

[57] ABSTRACT

A vehicle exhaust-gas purifier adapted for use on a testing line in a repair shop or the like is provided, wherein exhaust gases emitted from an engine of a vehicle are gathered directly from the vehicle and emitted into the environment after being purified. The vehicle exhaust-gas purifier is provided with a mechanism for preventing deterioration of catalysts used for reducing gaseous pollutants in the exhaust gases. The purifier has an exhaust-gas gathering nozzle A which is detachably connected to an exhaust pipe of an engine of a vehicle. The exhaust gases are introduced through the exhaust-gas gathering nozzle A and an inlet C into a purifier housing. Then, any carbon particles and unburned fuel mist particles are removed from the exhaust gases through a filter chamber 10, and then the major gaseous pollutants, HC, $NO_x$, and CO, are removed from the exhaust gases through a catalyst chamber 20. The filter chamber 10 has a filter unit 11 and an electrostatic dust collecting unit 12 provided therein. Any carbon particles and unburned fuel accumulated on the electrostatic dust collecting unit 12 are removed therefrom in a cleaning chamber 40 so as to refresh the electrostatic dust collecting unit 12.

4 Claims, 3 Drawing Sheets

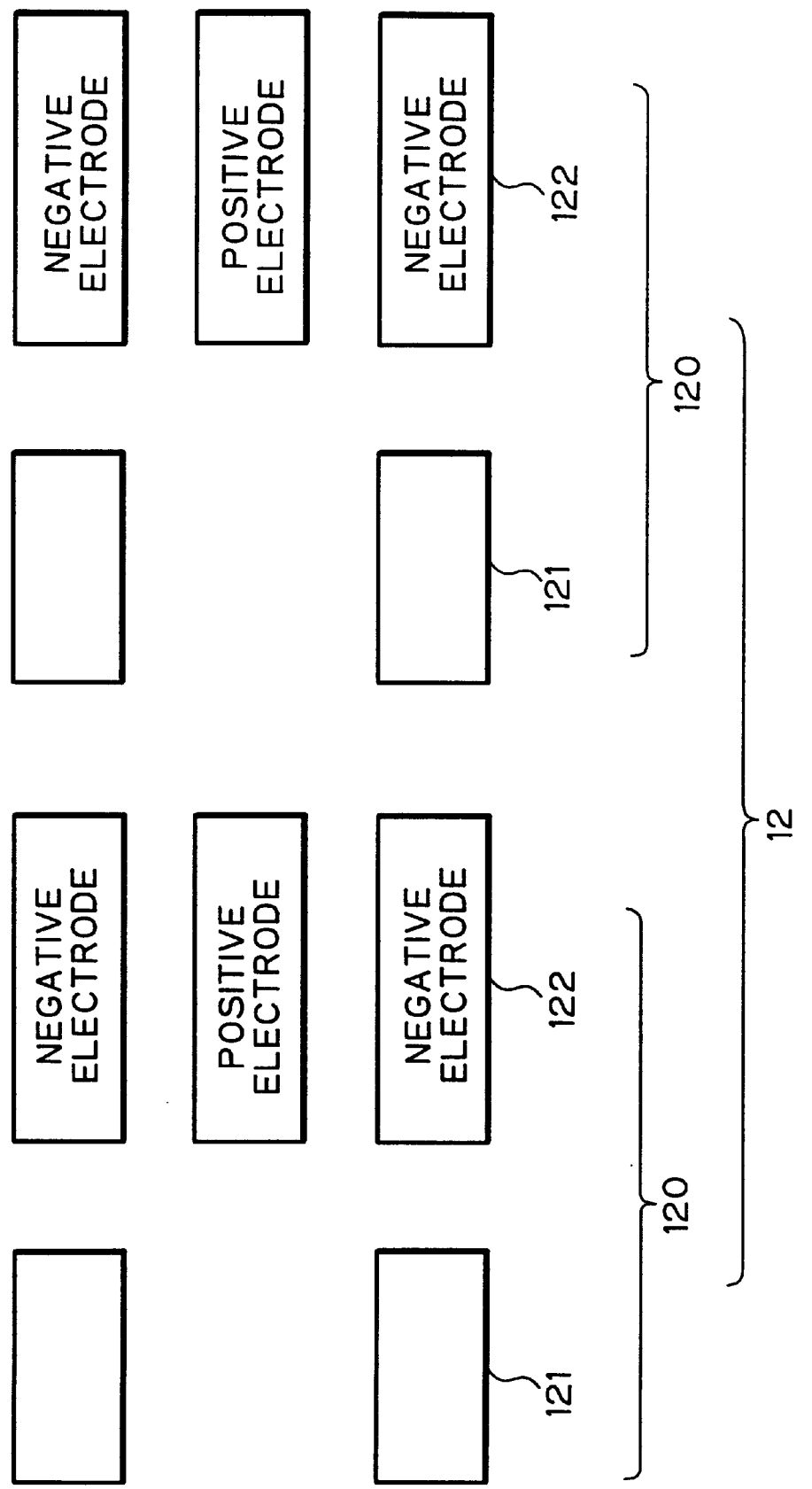

VEHICLE EXHAUST-GAS PURIFIER

BACKGROUND OF THE INVENTION

The present invention relates to a vehicle exhaust-gas purifier. More particularly, the present invention relates to such a vehicle exhaust-gas purifier in which exhaust gases emitted from an engine of a vehicle during testing operation of the engine in a garage, repair shop or the like are gathered directly from the vehicle and emitted to the environment after being purified.

Exhaust gases emitted from an engine of a vehicle contains harmful pollutants including carbon monoxide (CO), hydrocarbons (HC), nitrogen oxides ($NO_x$), sulphur oxides ($SO_x$) and dust and mist particles all of which tend to cause air pollution. Presently, legal restrictions are imposed on the vehicle exhaust-emissions in many countries requiring that the density and/or the total amount of each specified pollutant in the exhaust gases emitted into the environment be less than a defined allowable level. With the efforts of automobile manufacturers, various techniques have been developed to reduce harmful pollutants in the vehicle' exhaust gases.

When engine-testing is conducted for a vehicle in a garage or repair shop, the engine is usually operated in doors so that the exhaust gases from the vehicle are directly emitted into the environment in the garage so as to build up in the confined space in the garage.

As one solution of this problem, there has been proposed an exhaust-gas ventilating system in which an exhaust-gas ventilating hose is connected to the exhaust pipe of each vehicle in the garage to positively gather the exhaust gases emitted from the vehicle by means of suction provided by a fan and the gathered exhaust gases are discharged from a discharging port of the system into the external environment outside the garage. This exhaust-gas ventilating system is actually used in many of garages and repair shops. This exhaust-gas ventilating system effectively control the density of the exhaust gases which could otherwise build up in the garage so as to keep a good working environment in the garage. Nevertheless, it arises another problem that the exhaust gases emitted from the discharging port of the system into the external environment outside a garage contain high-density, harmful pollutants. Sometimes, a number of vehicles in a garage may undergo engine-testing at the same time, when a large amount of exhaust gases are emitted into the external environment, so that the density of the emitted exhaust gases outside the garage around the discharging ports of the exhaust-gas ventilating systems may be extremely high.

In order to solve this problem, the applicant has proposed an exhaust-gas purifier in which exhaust gases emitted from a vehicle are gathered directly form the vehicle and emitted from the purifier into the environment after being purified. See Japanese published patent application No. 100633/1996. When, however, this exhaust-gas purifier is used for a vehicle equipped with a diesel engine, it suffers from a further problem that a diesel engine in operation emits a large amount of particulate matter, resulting in accelerated deterioration of the catalysts and deodorants used in the exhaust-gas purifier.

SUMMARY OF THE INVENTION

In view of the foregoing, it is an object of the present invention to provide a vehicle exhaust-gas purifier wherein exhaust gases emitted from a vehicle are gathered directly from the vehicle and emitted into the environment after being purified, and wherein any deterioration of exhaust-gas-purifying catalysts and deodorants may be minimized.

According to the present invention, there is provided a vehicle exhaust-gas purifier for purifying exhaust gases emitted from a vehicle having an engine and an exhaust pipe for the engine, comprising: an exhaust-gas gathering nozzle adapted for detachable connection to the exhaust pipe of the vehicle for gathering exhaust gases emitted from the vehicle; a filter chamber having an filter unit and an electrostatic dust collecting unit provided therein for removing any carbon particles and unburned fuel mist particles from the exhaust gases gathered through the exhaust-gas gathering nozzle; a catalyst chamber having at least one catalyst/activated-carbon layer provided therein for further purifying the exhaust gases from which carbon particles and unburned fuel mist particles have been removed through the filter chamber; an introduction section connecting the exhaust-gas gathering nozzle and the filter chamber for introducing gathered exhaust gases into the filter chamber; and an emission section for emitting purified exhaust gases into environment; wherein the vehicle exhaust-gas purifier is adapted for use while being directly connected to the exhaust pipe of the vehicle.

Generally, a vehicle or automotive equipped with a diesel engine emits exhaust gases which contain a considerable amount of particulate matter including carbon particles, sulphur oxides particles and unburned fuel mist particles which typically contain some oil. In particular, more unburned fuel is emitted from a diesel engine when the temperature of combustion is relatively low such as during idle operation of the engine, and the unburned fuel mist particles in the exhaust gases tend to fill up the pores in granules of activated carbon and/or catalysts so as to accelerate deterioration of the activated carbon and/or catalysts. The unburned fuel mist particles in the exhaust gases typically have sizes ranging 0.01 to 0.1 microns.

With a vehicle exhaust-gas purifier according to the present invention, exhaust gases emitted from a vehicle are gathered directly from the vehicle through a exhaust-gas gathering nozzle and introduced directly into a filter chamber through the introduction section of the vehicle exhaust-gas purifier. The filter chamber has a filter unit and an electrostatic dust collecting unit provided therein. The exhaust gases contain carbon particles, of which relatively large ones are caught by the filter unit and thereby removed from the exhaust gases. Then, relatively small carbon particles and unburned fuel mist particles are caught by the electrostatic dust collecting unit.

The filter unit catches the relatively large particles before the exhaust gases reach the electrostatic dust collecting unit. As described above, the unburned fuel mist particles typically have sizes smaller than 0.1 microns, the filter unit may have a filter element which is capable of catching carbon particles greater than 0.1 microns. Since unburned fuel in the exhaust gases is sticky due to oil contained in it, the filter element may have been preferably treated for preventing any decrease in its permeability which could be otherwise caused by accumulation of the unburned fuel caught by the filter element. The filter element may be preferably formed, for example, from a piece of nonwoven polyester soaked with a suitable air filter-oil.

The electrostatic dust collecting unit is used to catch those particulate pollutants which have passed though the filter unit, so that it may preferably comprise an electrostatic dust collecting cell capable of catching particles smaller than 0.1 microns in size. In particular, the electrostatic dust collecting cell may be preferably of a two-stage charging type, having discharging electrodes for charging carbon particles and unburned fuel mist particles with negative charge, and collector electrodes for collecting the charged particles thereon. Further, it may be preferable that the electrostatic dust collecting unit has two such cells of the two-stage charging type, in order to prevent any abnormal reemission of collected particles into the exhaust gases or any recharging of collected particles by the collector electrodes.

The catalyst chamber receives the exhaust gases having carbon particles and unburned fuel mist particles removed therefrom through the filter chamber. The major pollutants contained in the received exhaust gases are carbon monoxide (CO), nitrogen oxides ($NO_x$) and hydrocarbons (HC), so that any of various catalysts suitable for handling these pollutants may be used. It is particularly preferable, however, to use catalyst showing high catalytic activity at room temperature together with activated carbon. For example, in order to reduce $NO_x$ and HC, a special activated carbon with phosphorous solvent added thereto may be preferably used. In order to reduce CO, any of catalysts showing high oxidizing activity at room temperature may be preferably used. Such catalysts include $MnO_2/CuO$ (i.e., granulated mixture of manganese dioxide and copper oxide), $Pd/Al_2O_3$ catalyst (i.e., so-called palladium catalyst) and AuS (i.e., so-called gold catalyst). As the exhaust gases pass through a catalyst/activated-carbon layer containing any of such catalysts, HC and $NO_x$ are adsorbed by and CO is oxidized into $CO_2$ by the catalyst/activated-carbon layer. It may be preferable to use two such layers in the catalyst camber in which the exhaust gases first pass through a first catalyst/activated-carbon layer for $NO_x$ and HC and then through a second catalyst/activated-carbon layer for CO and HC.

Further, the vehicle exhaust-gas purifier may preferably comprise a cleaning chamber, wherein the cleaning chamber comprises: an air nozzle for removing from the electrostatic dust collecting unit any carbon particles and unburned fuel accumulated on the electrostatic dust collecting unit; an oil separator for separating any oil from such carbon particles and unburned fuel which have been removed from the electrostatic dust collecting unit; and a deodorizer for deodorizing any air flowing out of the cleaning chamber into environment.

In the case where the vehicle exhaust-gas purifier comprises a cleaning chamber of the above arrangement, the electrostatic dust collecting unit, and in particular the electrostatic dust collecting cells thereof, may be cleaned each time when the purifier has been used for exhaust-gas purification treatment for a vehicle. The cleaning may effectively prevent any decrease in the voltage induced in the electrostatic dust collecting cells or any decrease in its efficiency for removing particles, which could otherwise occur due to the adherence of sticky oil on the surfaces of the electrostatic dust collecting cells when a large amount of carbon particles and unburned fuel mist particles containing oil have been accumulated on the cells.

The air nozzle blows an air jet on the surfaces of the electrostatic dust collecting cells to remove therefrom any carbon particles and unburned fuel accumulated thereon. This may effectively prevent narrowing the flow path through the cells so as to refresh the cells.

The oil separator may preferably comprise a filter unit for catching relatively light ones of carbon particles and unburned fuel mist particles sprayed away from the electrostatic dust collecting unit by the air nozzle and an oil collector for collecting any oil contained in those of the sprayed particles which have fallen down onto the oil collector; and the deodorizer may preferably comprise at least one activated-carbon layer. More specifically, of the carbon particles and unburned fuel mist particles thus sprayed away from the electrostatic dust collecting cells by the air jet from the air nozzle, relatively small and fine (and thus light) ones may be conveyed by air to reach the filter unit, while relatively large (and thus heavy) ones tend to fall down onto the bottom of the cleaning chamber. Here, the relatively large carbon particles are typically formed by cohesion of smaller, neighboring carbon particles due to the presence of sticky oil, which may occur on the electrostatic dust collecting cells on which carbon particles and oil are accumulated. The relatively large carbon particles may grow to be about 3 millimeters in size. It is desirable that any waste oil contains little amount of carbon particles for an easier disposal treatment, so that an oil separator plate may be preferably provided at the bottom of the cleaning chamber for separating carbon particles from the oil. While the oil separator plate may be made in various forms, it may be preferably a flat, perforated plate having perforations which are small enough to prevent the relatively large carbon particles from passing through the perforated plate.

With the vehicle exhaust-gas purifier having the above arrangement, the filter chamber and the catalyst chamber may be preferably disposed in a first line, the cleaning chamber may be preferably disposed in a second line different from the first line, and the vehicle exhaust-gas purifier may preferably comprises an electrostatic dust collecting-unit moving mechanism for moving the electrostatic dust collecting unit between a first position within the filter chamber and a second position within the cleaning chamber. With such arrangement, any carbon particles and unburned fuel collected by and accumulated on the electrostatic dust collecting unit may be effectively prevented from entering the catalyst chamber, which in turn may effectively prevent deterioration of the catalyst/activated-carbon layers disposed in the catalyst chamber. The electrostatic dust collecting-unit moving mechanism may preferably comprise a dust collecting-unit support member fixedly connected to the electrostatic dust collecting unit, a guide member for guiding the movement of the electrostatic dust collecting-unit support member, and a drive unit for driving the electrostatic dust collecting-unit support member for movement along the guide member.

Further, with the vehicle exhaust-gas purifier having the above arrangement, the introduction section may be preferably comprise a first flow-guiding chamber for guiding flow of the exhaust gases introduced into the purifier housing and the emission section may be preferably comprise a second flow-guiding chamber for guiding flow of the purified exhaust gases emitted out of the purifier housing. By virtue of the provision of the first flow-guiding chamber, the exhaust gases introduced through the introduction section into the purifier housing may be effectively prevented from impinging only confined region on the filter unit, so that deterioration of the filter unit may be minimized.

BRIEF DESCRIPTION OF THE DRAWINGS

The above and other objects, features and advantages of the present invention will be apparent from the following detailed description of an preferred embodiment thereof, reference being made to the accompanying drawings, in which:

FIG. 3 is a schematic view of a part of an electrostatic dust collecting unit used in the vehicle exhaust-gas purifier of FIG. 1.

PREFERRED EXAMPLE OF THE INVENTION

Referring now to the accompanying drawings, we will describe a preferred embodiment of the present invention, which is presented by way of example only and should not be construed as restrictive.

Figure 1:
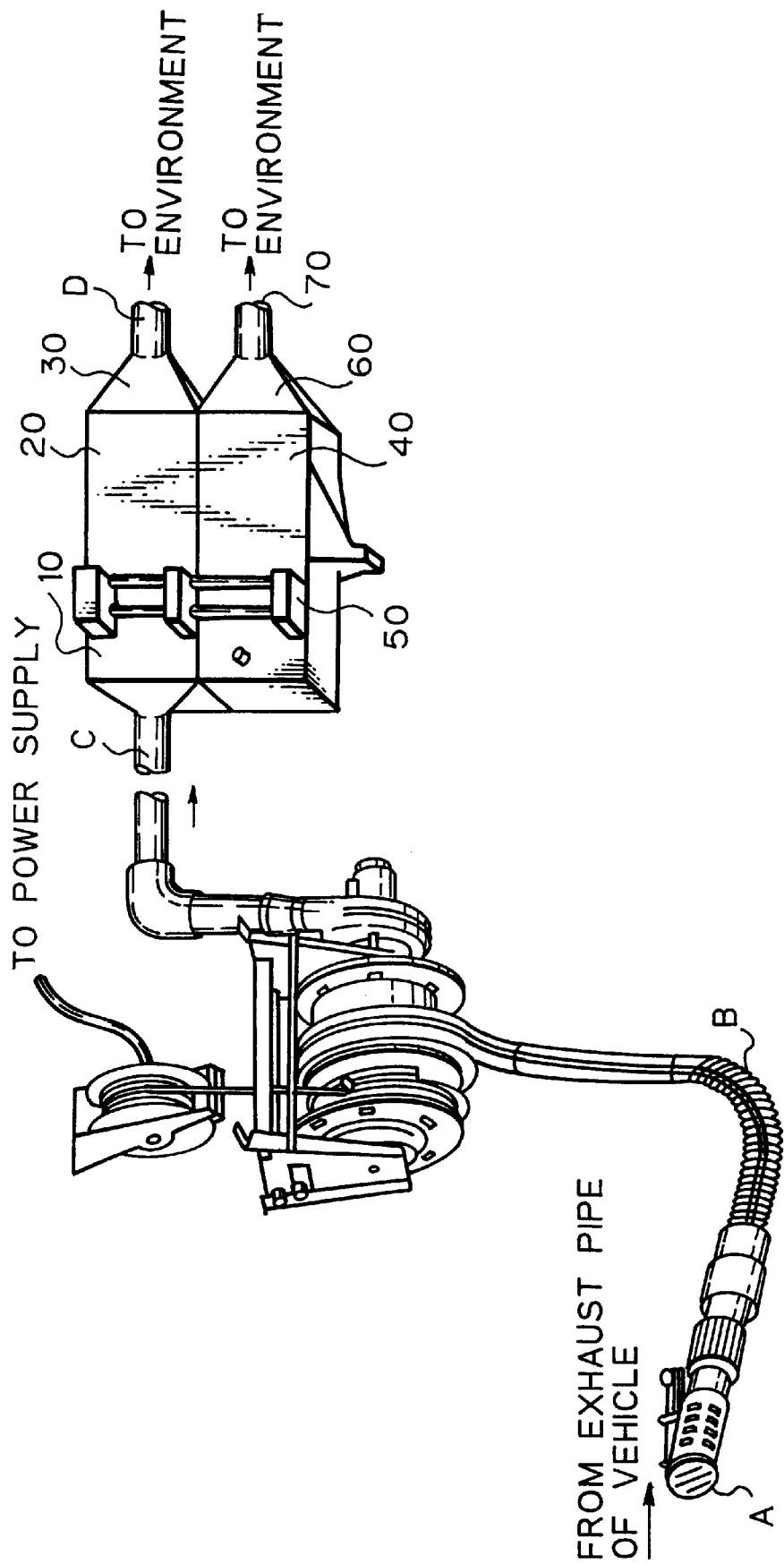
FIG. 1 is a schematic perspective view of a vehicle exhaust-gas purifier according to an embodiment of the present invention.

FIG. 1 is a simplified perspective view of a vehicle exhaust-gas purifier according to an embodiment of the present invention. The vehicle exhaust-gas purifier 1 is adapted for use while being directly connected to an exhaust pipe of a vehicle (not shown), and comprises an exhaust-gas gathering nozzle A provided at an end of an exhaust-gas hose B and a purifier housing having an inlet C and outlet D. The exhaust gases gathered by means the exhaust-gas gathering nozzle A and the exhaust-gas hose B are introduced into the purifier housing through the inlet C and emitted therefrom through the outlet D into the environment after being purified.

The exhaust-gas gathering nozzle A and the exhaust-gas hose B may be made of any of suitable, heat-resistant materials which allow the direct connection of them to the exhaust pipe of a vehicle. Further, the exhaust-gas gathering nozzle A and the exhaust-gas hose B may have any of suitable arrangements and forms for effectively preventing the exhaust gases emitted from the exhaust pipe from escaping into the environment. A fan (see FIG. 1) is connected between the exhaust-gas hose B and the inlet C for sucking the exhaust gases into the purifier housing. The fan may be any of conventional fans used for sucking vehicle exhaust gases.

The inlet C and the outlet D are in communication with the purifier housing through first and second flow-guiding chambers 31 and 32, respectively. The flow-guiding chambers 31 and 32 each generally has a shape of a truncated pyramid, defines a flow path for the exhaust gases, and has a smaller cross-section end at which the inlet C or the outlet D is provided and a larger cross-section end connected to the purifier housing.

Figure 2:
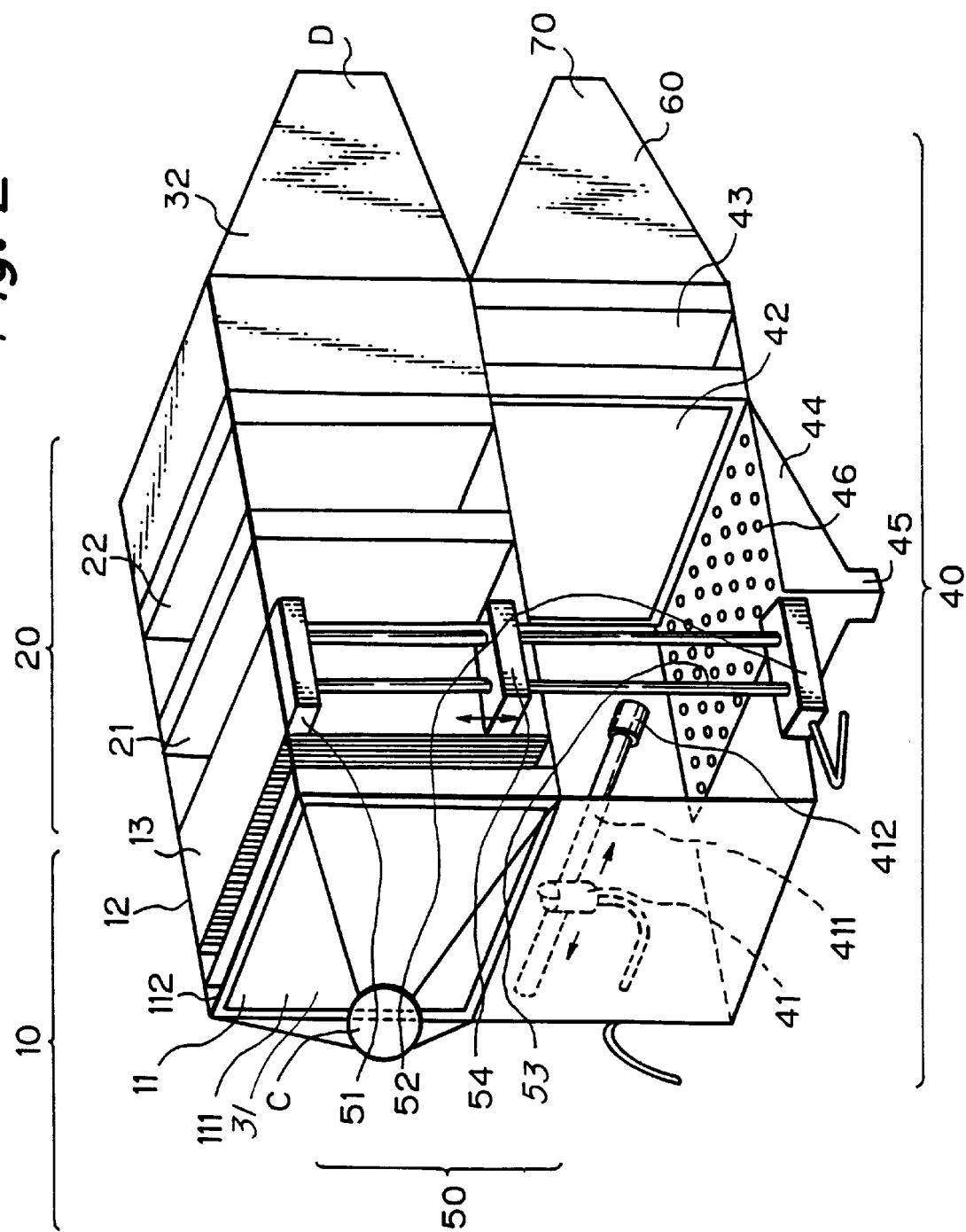
FIG. 2 is a skeleton perspective view of the vehicle exhaust-gas purifier of FIG. 1.

FIG. 2 is a skeleton perspective view of the vehicle exhaust-gas purifier showing the arrangement inside the purifier housing. As shown, the purifier housing defines a filter chamber 10 and a catalyst chamber 20. The filter chamber 10 has a filter unit 11 and an electrostatic dust collecting unit 12 provided therein for removing carbon particles and unburned fuel mist particles from the exhaust gases introduced through the inlet C into the filter chamber 10. The catalyst chamber 20 has two catalyst/activated-carbon layers 21 and 22 for further purifying the exhaust gases from which carbon particles and unburned fuel mist particles have been removed through the filter chamber 10.

The filter chamber 10 is in communication with the first flow-guiding chamber 31 on which the inlet C is provided. The filter unit 11 is disposed adjacent to the first flow-guiding chamber 31 and the electrostatic dust collecting unit 12 is disposed adjacent to the filter unit 11 on the opposite side to the first flow-guiding chamber 31, so that the exhaust gases introduced through the inlet C and the first flow-guiding chamber 31 into the filter chamber 10 first pass through the filter unit 11 and then through the electrostatic dust collecting unit 12. The filter unit 11 comprises a filter element 111 which may be formed, for example, from a piece of nonwoven polyester soaked with a suitable air filter-oil and a frame 112 for locating the filter element 111 in position in the filter chamber 10. The filter unit 11 is formed as a disposal unit and replaced with a new one when it can no longer provide sufficient performance after long-term use. The electrostatic dust collecting unit 12 may preferably comprise two or more electrostatic dust collecting cells 120, each of which has discharging electrodes 121 disposed near the upstream end of the cell and collector electrodes 122 disposed near the downstream end of the cell. The electrostatic dust collecting unit 12 has a housing 13 for receiving the cells 120, so that the electrostatic dust collecting unit 12 is formed as a self-contained unit. An electrostatic dust collecting-unit support member 54 (described below in detail) is fixedly connected to one side wall of the housing 13 and serves to move the electrostatic dust collecting unit 12 between a first position within the filter chamber 10 and a second position within a cleaning chamber 40 (described below in detail) when necessary.

The catalyst chamber 20 is disposed adjacent and downstream to the filter chamber 10. The catalyst chamber 20 includes the first catalyst/activated-carbon layer 21 for handling HC and $NO_x$ disposed near the upstream end of the catalyst chamber 20 and the second catalyst/activated-carbon layer 22 for handling HC and CO disposed near the downstream end of the catalyst chamber 20. The first catalyst/activated-carbon layer 21 for $HC/N_x$ contains special activated-carbon with phosphorous solvent added thereto. The second catalyst/activated-carbon layer 22 for HC/CO contains granulated mixture of manganese dioxide and copper oxide ($MnO_2$/CuO) and activated carbon. These materials are filled in cartridges to form the layers, and the cartridges are replaced with new ones when necessary. While in the disclosed embodiment a single first layer 21 and a single second layer 22 are used, more layers may be used if desirable.

Adjacent and downstream to the catalyst chamber 20, the second flow-guiding chamber 32 is provided having the outlet D formed at its tail end.

Of the above-described components, the inlet C, the first flow-guiding chamber 31, the filter chamber 10, the catalyst chamber 20, the second flow-guiding chamber 21 and the outlet D forms a line which defines the upper section of the vehicle exhaust-gas purifier, as shown in FIG. 2. This line is referred to as the exhaust-gas purification line. FIG. 2 also shows a second line defining the lower section of the vehicle exhaust-gas purifier just below the exhaust-gas purification line. The second line, referred to as the cleaning line, includes the above-mentioned cleaning chamber 40 and a third flow-guiding chamber 60. The cleaning line is used to clean the electrostatic dust collecting unit 12 in order to prevent or minimize any decrease in precipitation efficiency of the electrostatic dust collecting unit 12 and thereby prevent deterioration of the catalyst/activated-carbon layers 21 and 22 disposed in the catalyst chamber 20.

Within the cleaning chamber 40 and just below the filter unit 11, there is provided an air nozzle 41 supported and guided by an air-nozzle guide member 411 extending in the horizontal direction and bridging the opposite side walls of the purifier housing. The air nozzle 41 is used to remove from the electrostatic dust collecting unit 12 any carbon particles and unburned fuel accumulated on the electrostatic dust collecting unit 12. An electric motor is provided at one end of the air-nozzle guide member 411 for reciprocating the air nozzle 41 along the length of the air-nozzle guide member 411. The air nozzle 41 is connected to an external air compressor (not shown) through an air hose. Within the cleaning chamber 40 and just below the electrostatic dust collecting unit 12, there is defined a space to receive the electrostatic dust collecting unit 12 when it is lifted down, to which space the air nozzle 41 is adjacent.

In order to displace of move the electrostatic dust collecting unit 12 into this space, there is provided an electrostatic dust collecting-unit moving mechanism 50 comprising upper and lower base blocks 51 and 52 fixedly mounted on one side wall of the purifier housing at positions near the upper and lower edges of the side wall, respectively, and just under the electrostatic dust collecting unit 12, a pair of vertical guide rods or electrostatic dust collecting-unit guide members 53 bridging the upper and lower base blocks 51 and 52 and defining the path of vertical reciprocation movement of the electrostatic dust collecting unit 12, the above-mentioned electrostatic dust collecting-unit support member 54 supporting the electrostatic dust collecting unit 12 and guided by the electrostatic dust collecting-unit guide members 52 for vertical movement along the guide members 52, and a drive unit (not shown) for driving the support member 54. The support member 54 is fixedly connected to the housing 13 of the electrostatic dust collecting unit 12 within which the electrostatic dust collecting cells are disposed. By virtue of this arrangement, the electrostatic dust collecting unit 12 may be lifted up and down together with the dust collecting-unit support member 54 driven by the drive unit.

Adjacent to the above-mentioned space for receiving the electrostatic dust collecting unit 12 and at the bottom of the catalyst chamber 20, there is disposed an oil separator for separating any oil from such carbon particles and unburned fuel which have been removed from the electrostatic dust collecting unit 12. The oil separator comprises a filter unit 42 for catching relatively small and fine (and thus light) ones of such carbon particles and unburned fuel mist particles that have been sprayed away from the electrostatic dust collecting unit 12 by the air jet from the air nozzle 41 and an oil collector 44 for collecting droplets of oil falling down on the oil separator.

The filter unit 42 includes a filter element which may be formed, for example, from a piece of nonwoven polyester. The oil collector 44 is funnel-shaped and has an oil drain 45 for draining accumulated oil out of the oil collector 44. The oil collector 44 is provided with an oil separator plate 46 for separating any carbon particles from the oil flowing down through the oil separator plate 46. The oil separator plate 46 is a flat, perforated plate having perforations which are small enough to prevent most of the carbon particles in the oil from passing through the perforated plate. Of cause, the oil separator plate 46 may be made in various other forms as long as it may prevent most of the carbon particles from passing through it into the oil collector 44.

Downstream to the oil separator, there is disposed a deodorizer unit for deodorizing any air flowing out of the cleaning chamber 40 into the environment. The deodorizer unit has a deodorizing activated-carbon layer 43 comprising an amount of ordinary activated-carbon granules filled in a cartridge which is replaceable in a conventional manner.

Adjacent and downstream to the deodorizing activated-carbon layer 43, there is provided the third flow-guiding chamber 60 having the cleaning chamber outlet 70 at its tail end.

Now it is described how to use the vehicle exhaustgas purifier described above.

First, the exhaust-gas gathering nozzle A is connected to an exhaust pipe of a vehicle equipped with an engine. Then, the engine of the vehicle is started while the fan of the vehicle exhaust-gas purifier is operated such that any and all the exhaust gases emitted out of the exhaust pipe are guided through the exhaust-gas hose B and introduced into the purifier housing through the inlet C. The exhaust gases introduced through the inlet C are diffused through the first flow-guiding chamber 31 into the filter chamber 10, where relatively large carbon particles are removed from the exhaust gases by means of the filter unit 11. Then, relatively small and fine carbon particles as well as any unburned fuel mist particles are charged by means of the discharging electrodes 121 of the electrostatic dust collecting unit 12 and the charged carbon particles and mist particles are attracted by and collected on the collector electrodes 122, and thus they are removed from the exhaust gases. Then, the exhaust gases, from which most of carbon particles and unburned fuel have been removed, are introduced into the catalyst chamber 20, where first a part of HC and most $NO_x$ are removed from the exhaust gases by adsorption to the first catalyst/activated-carbon layer 21 for HC and $NO_x$, and then most of the remaining part of HC and most CO are removed by the second catalyst/activated-carbon layer 22 for HC and CO in which HC is adsorbed to and CO is oxidized into $CO_2$ by the second layer 22. The exhaust gases thus purified contain a substantial amount of $CO_2$ with little pollutant, being no longer harmful, and is emitted into the environment through the second flow-guiding chamber 32 and the outlet D.

The electrostatic dust collecting unit 12 may be cleaned when the purifier has been used for the exhaust-gas purification treatment. For the cleaning, the drive unit of the electrostatic dust collecting-unit moving mechanism 50 is operated to lift down the electrostatic dust collecting-unit support member 54 along the electrostatic dust collecting-unit guide members 53. At the same time, the air compressor is operated to blow out an air jet from the air nozzle 41. Further, while the electrostatic dust collecting unit 12 is lifted down together with the electrostatic dust collecting-unit support member 54, the air nozzle 41 is reciprocated in the horizontal direction along the air-nozzle guide member 411 so as to fully traverse or scan the electrostatic dust collecting unit 12 in the horizontal direction, so that the air nozzle 41 blows the air jet throughout the electrostatic dust collecting unit 12 to spray away therefrom any carbon particles and unburned fuel accumulated thereon. This operation continues until the electrostatic dust collecting-unit support member 54 reaches the lower base block 52.

Of the carbon particles and unburned fuel mist particles thus sprayed away from electrostatic dust collecting unit 12 by the air jet from the air nozzle 41, relatively small and fine (and thus light) ones are conveyed by the air to reach the filter unit 42, while relatively large (and thus heavy) ones tend to fall down onto the oil separator plate 46, wherein the carbon particles will remain on the oil separator plate 46 while any oil contained in the fallen particles will flow down into the oil collector 44 underlying the oil separator plate 46. The oil is then directed by the funnel-shaped oil collector 44 to the oil drain 45 and drained out therethrough.

The air, now conveying only relatively light ones of the carbon particles and unburned fuel mist particles sprayed away from the electrostatic dust collecting unit 12 as described above, passes through the filter unit 42, when the particles are caught and removed by the filter unit 42. Then, the air passes through the deodorizing activated-carbon layer 43 to flow out of the cleaning chamber 40 into the environment through the third flow-guiding chamber 60 and the cleaning chamber outlet 70, when the air is deodorized by the deodorizing activated-carbon layer 43.

Example

An experiment on the vehicle exhaust-gas purification treatment using the disclosed vehicle exhaust-gas purifier has been conducted to show the following results.

Conditions:

A diesel engine (having displacement of 7,000 cubic centimeters) was operated in idle (at a speed of about 700 rpm), while the exhaust gases emitted from the exhaust pipe of the engine was introduced into the disclosed vehicle exhaust-gas purifier so as to measure the purification ratio achieved. For this measurement, the raw (i.e., unpurified) exhaust gases from the exhaust pipe of the engine were first analyzed to find that they contain 20 ppm of $NO_x$ and 10 ppm of HC. Then, the exhaust gases after being purified by the purifier were analyzed both with and without the filter unit 11 in the filter chamber 10 for comparison.

Results:

Table 1 below shows the results of the experiment. Note that the purification ratio means the relative ratio of the density of each pollutant in the purified exhaust gases to that in the unpurified exhaust gases.

TABLE 1

| Engine-Operation | Purification Ratio (%) | | | |
|---|---|---|---|---|
| | with Filter Unit | | without Filter Unit | |
| Time (hours) | for $NO_x$ | for HC | for $NO_x$ | for HC |
| 0 | 93.5 | 90.4 | 92.0 | 91.4 |
| 10 | — | — | 59.9 | 90.6 |
| 20 | — | — | 39.5 | 85.4 |
| 30 | — | — | 21.3 | 80.1 |
| 50 | 74.7 | 82.5 | — | — |
| 100 | 52.8 | 63.4 | — | — |
| 150 | 35.2 | 40.5 | — | — |

Table 1 above indicates that the disclosed vehicle exhaust-gas purifier achieved initial purification ratios as high as more than 92% for $NO_x$ and more than 90% for HC even without the filter unit 11. Further, the use of the filter unit 11 added to the initial purification ratios by 1.5 point for $NO_x$ and by 1 point for HC. The purification ratio for $NO_x$ decreased to as low as 21% after thirty-hour engine-operation without the filter unit 11, while it remained at relatively high level of about 75% even after fifty-hour engine-operation with the filter unit 11.

The vehicle exhaust-gas purifier is used while being directly connected one to each vehicle, so that high-level exhaust gases are never emitted directly into the working environment and thus the working environment may be maintained in good condition. Further, since any exhaust gases from a vehicle in a garage can be emitted into the external environment outside the garage after being purified, the vehicle exhaust-gas purifier may also overcome the longstanding problem that the environment outside a garage or repair shop may suffer air pollution by the exhaust gases from a vehicle in the garage.

In particular, since the exhaust gases from a vehicle first pass through the filter chamber having the filter unit and the electrostatic dust collecting unit provided therein, where any carbon particles and unburned fuel mist particles may be removed from the exhaust gases before the latter reach the catalyst chamber for handling gaseous pollutants contained in the exhaust gases, any deterioration of the catalysts or the activated carbon in the catalyst chamber may be effectively prevented, so that the performance of the vehicle exhaust-gas purifier may be maintained at high level.

In the case where a cleaning chamber such as disclosed above is provided for the electrostatic dust collecting unit, the electrostatic dust collecting unit may be cleaned just after the purifier has been used for exhaust-gas purification treatment for a vehicle, so that any decrease in particle-removal performance of the electrostatic dust collecting unit may be effectively prevented.

Moreover, a vehicle exhaust-gas purifier according to the present invention may be used while being directly connected to a vehicle, may be designed in relatively compact forms, may enhance easy maintenance such as replacement of components or others, may be manufactured at with relatively low costs and may enhance easy attachment to and detachment from a vehicle, so that it can be conveniently used in particular by a small business for repair and/or testing of automobiles.

Having described the present invention with reference to a preferred embodiment thereof, it is to be understood that the present invention is not limited to the disclosed embodiment, but may be embodied in various other forms without departing from the spirit and the scope of the present invention as defined by the appended claims.

What is claimed is:

1. A vehicle exhaust-gas purifier for purifying exhaust gases emitted from a vehicle having an engine and an exhaust pipe for the engine, comprising:

an exhaust-gas gathering nozzle adapted for detachable connection to the exhaust pipe of the vehicle for gathering exhaust gases emitted from the vehicle;

filter chamber having an filter unit and an electrostatic dust collecting unit provided therein for removing any carbon particles and unburned fuel mist particles from the exhaust gases gathered through said exhaust-gas gathering nozzle;

a catalyst chamber having a catalyst/activated-carbon layer provided therein for further purifying the exhaust-gases from which carbon particles and unburned fuel mist particles have been removed through said filter chamber;

an introduction section connecting said exhaust-gas gathering nozzle and said filter chamber for introducing gathered exhaust gases into said filter chamber;

an emission section for emitting purified exhaust gases into environment; and a cleaning chamber comprising:

an air nozzle for removing from said electrostatic dust collecting unit any carbon particles and unburned fuel accumulated on said electrostatic dust collecting unit;

an oil separator for separating any oil from such carbon particles and unburned fuel which have been removed from said electrostatic dust collecting unit; and a deodorizer for deodorizing any air including said carbon particles and unburned fuel which oil have been removed and flowing out of said cleaning chamber into environment, wherein said vehicle exhaust-gas purifier is adapted for use while being directly connected to the exhaust pipe of the vehicle.

2. A vehicle exhaust-gas purifier according to claim 1, wherein:

said oil separator comprises a filter unit for catching relatively light ones of such carbon particles and unburned fuel mist particles which have been sprayed away from said electrostatic dust collecting unit by said air nozzle and an oil collector for collecting any oil contained in those of said sprayed particles which have fallen down onto said oil collector; and said deodorizer comprises an activated-carbon layer.

3. A vehicle exhaust-gas purifier for purifying exhaust gases emitted from a vehicle having an engine and an exhaust pipe for the engine, comprising:

an exhaust-gas gathering nozzle adapted for detachable connection to the exhaust pipe of the vehicle for gathering exhaust gases emitted from the vehicle;

a filter chamber having a filter unit and an electrostatic dust collecting unit provided therein for removing any carbon particles and unburned fuel mist particles from the exhaust gases gathered through said exhaust-gas gathering nozzle;

a catalyst chamber having a catalyst/activated-carbon layer provided therein for further purifying the exhaust-gases from which carbon particles and unburned fuel mist particles have been removed through said filter chamber;

an introduction section connecting said exhaust-gas gathering nozzle and said filter chamber for introducing gathered exhaust gases into said filter chamber; and an emission section for emitting purified exhaust gases into environment;

said vehicle exhaust-gas purifier is adapted for use while being directly connected to the exhaust pipe of the vehicle;

said filter chamber and said catalyst chamber are disposed in a first line;

said vehicle exhaust-gas purifier further compromises a cleaning chamber disposed in a second line different from said first line, said cleaning chamber comprising:

an air nozzle for removing from said electrostatic dust collecting unit any carbon particles and unburned fuel accumulated on said electrostatic dust collecting unit;

an oil separator for separating any oil from such carbon particles and unburned fuel which have been removed from electrostatic dust collecting unit; and a deodorizer for deodorizing any air including said carbon particles and unburned fuel which oil have been removed and flowing out of said cleaning chamber into environment; and said vehicle exhaust-gas purifier further comprises an electrostatic dust collecting-unit moving mechanism for moving said electrostatic dust collecting unit between a first position within said filter chamber and a second position within said cleaning chamber.

4. A vehicle exhaust-gas purifier according to claim 3, wherein:

said oil separator comprises a filter unit for catching relatively light ones of such carbon particles and unburned fuel mist particles which have been sprayed away from said electrostatic dust collecting unit by said air nozzle and an oil collector for collecting any oil contained in those of said sprayed particles which have fallen down onto said oil collector; and said deodorizer comprises an activated-carbon layer.

\* \* \* \* \*